United States Patent Office 3,830,803
Patented Aug. 20, 1974

3,830,803
5-LOWERALKYL-1-PHENYL-1,3,4,6-TETRAHYDRO-5H-BENZ[f]-2,5-OXAZOCINES AND 4-ONES
Murle W. Klohs, Tarzana, Marshall D. Draper, Woodland Hills, and Francis J. Petracek, Canoga Park Calif., assignors to Riker Laboratories, Inc., Northridge, Calif.
No Drawing. Filed May 10, 1965, Ser. No. 454,738
Int. Cl. C07d 87/54
U.S. Cl. 260—239.3 B       4 Claims

ABSTRACT OF THE DISCLOSURE

Substituted 1-phenyl-1,3,4,6-tetrahydro-5H-benz[f]-2,5-oxazocine final products having significant pharmacological activity as diuretic agents and central nervous system stimulants, and the substituted 1-phenyl-1,3,4,6-tetrahydro-5H-benz[f]-2,5-oxazocin - 4 - one intermediates obtained in the synthesis thereof.

This invention relates to compositions of matter classified in the art of chemistry as substituted benzoxazocines and to intermediates obtained in the synthesis thereof.

The invention sought to be patented, in its final product composition aspect, is described as residing in the concept of chemical compound having a molecular structure in which the benz[f]-2,5-oxazocine nucleus bears at the 1-position a phenyl radical and on the nitrogen atom (5-position) a lower alkyl radical, and the hereinafter described equivalents thereof.

The invention sought to be patented, in a first intermediate composition aspect, is described as residing in the concept of a chemical compound having a molecular structure in which the benzhydrol nucleus bears at the 2-position an N-lower alkyl carbamoyl radical and the hereinafter described equivalents thereof.

The invention sought to be patented, in a second intermediate composition aspect, is described as residing in the concept of a chemical compound having a molecular structure in which the benzhydrol nucleus bears at the 2-position a lower alkylaminomethyl radical, and the hereinafter described equivalents thereof.

The invention sought to be patented, in a third intermediate composition aspect, is described as residing in the concept of a chemical compound having a molecular structure in which the benz[f]-2,5-oxazocin-4-one nucleus bears at the 1-position a phenyl radical and on the nitrogen atom (5-position) a lower alkyl radical, and the hereinafter disclosed equivalents thereof.

As used throughout the application the terms "lower alkyl" and "lower alkoxy" embrace both straight and branched chain alkyl and alkoxy radicals, respectively, containing from 1 to 6 carbon atoms, for example methyl, ethyl, propyl, isopropyl, n-butyl, tert-butyl, hexyl, 2-ethylbutyl and the like in the case of lower alkyl and methoxy, ethoxy, propoxy, isopropoxy, n-butoxy, tert-butoxy, n-hexyloxy, 2-ethylbutoxy and the like in the case of lower alkoxy; and the term "halo" embraces chloro, bromo, iodo and fluoro.

The tangible embodiments of this invention, in its final product and intermediate composition aspects, possess the inherent general physical characteristics of being solid crystalline materials, as the free base in the case of the first and third intermediate composition aspect and in the form of acid-addition salts in the case of the final product and second intermediate composition aspects. Infra-red spectral data, elemental analysis and the aforementioned physical characteristics, taken together with the nature of the starting material and mode of synthesis positively confirm the structures of the compounds sought to be patented.

The tangible embodiments of this invention, in its final product composition aspect, possess the inherent applied use characteristics of having significant pharmacological activity without adverse toxicity as diuretic agents and central nervous system stimulants as determined by recognized and accepted pharmacological test procedures. The tangible embodiments of this invention in its intermediate product composition aspects are valuable chemical intermediates as described hereinafter.

The manner and process of using the invention will now be generally described so as to enable one skilled in the art of chemistry to make and use the same as follows:

The reaction sequence leading to the preparation of the substituted benz[f]-2,5-oxazocines of this invention is set forth as follows:

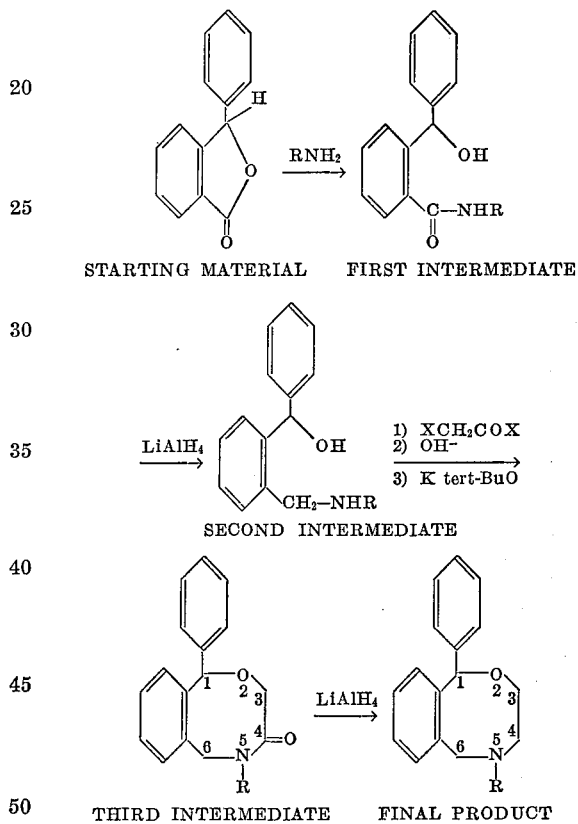

wherein R is lower alkyl and X is halo. The third intermediates and the final products as shown in the reaction sequence are, respectively, 5-alkyl-1-phenyl-1,3,4,6-tetrahydro-5H-benz[f]-2,5-oxazocin - 4 - ones and 5-alkyl-1-phenyl-1,3,4,6-tetrahydro-5H-benz[f]-2,5-oxazocines.

The o-carboxybenzhydrol-γ-lactone starting material described in the reaction sequence depicted hereinabove is a known compound that is readily prepared as described by Curtin and Fletcher [J. Org. Chem. 19:352–6 1954)] through treatment of o-benzoylbenzoic acid with sodium borohydride.

Starting materials wherein either one or both of the benzene rings in the o-carboxybenzhydrol-γ-lactone starting material bear one or more lower alkyl, lower alkoxy, halo or trifluoromethyl radicals are the full equivalents in the above depicted reaction sequence to the specific starting material therein described, and are prepared by the same procedures disclosed in the Curtis and Fletcher paper referred to hereinabove. Their use in the above reaction sequence results in the preparation of intermediate compositions and final products wherein the benzene rings bear lower alkyl, lower alkoxy, halo or trifluoromethyl radicals at the same position as in the starting material, such intermediates and final products having the same utility as the specific intermediates and final products depicted in the reaction sequence and being included within the scope of this invention.

The o-carboxybenzhydrol-γ-lactone starting material is converted to the 2-(N-lower alkylcarbamoyl)benzhydrol which comprises the tangible embodiments of the invention in its first intermediate composition aspect, by treatment with an appropriate alkylamine, such as methylamine, ethylamine, propylamine, isopropylamine and the like, in the presence of a non-reactive solvent in which the alkylamine is soluble, preferably an aqueous medium, and at a temperature of from 0° C. to room temperature. The product of the reaction is then recovered by conventional techniques of isolation and purification.

The 2-(N-lower alkylcarbamoyl)benzhydrols are converted to the 2-(N-lower alkylaminomethyl)benzhydrols, comprising the tangible embodiments of the invention in its second intermediate composition aspect, by treatment at reflux temperatures in the presence of an inert organic solvent, such as, tetrahydrofuran, with an alkali metal aluminohydride reducing agent such as lithium aluminum hydride. The product of the reaction is then recovered, preferably in the form of an acid-addition salt, by conventional techniques of isolation and purification.

The 2-(N-lower alkylaminomethyl)benzhydrols are converted to the 5-lower alkyl-1-phenylbenz[f]-2,5-oxazocin-4-ones, comprising the tangible embodiments of this invention in its third intermediate composition, aspect by means of a three stage reaction sequence. Treatment with an appropriate halo-acetyl halide, in the presence of an inert organic solvent such as ether, pyridine, or mixtures thereof at a temperature of from 0° C. to room temperature, results in formation of 2-(N-lower alkylhaloacetamidomethyl)benzhydrol halo-acetates which are separated from the solvent and upon treatment with base are selectively hydrolyzed to form 2-(N-lower alkylhaloacetamidomethyl)benzhydrols which are in turn converted to 5-lower alkyl-1-phenylbenz[f]-2,5-oxazocin-4-ones by treatment with potassium-tert-butoxide in the presence of an organic solvent such as dimethyl sulfoxide. This product is then recovered by conventional techniques of isolation and purification. The di- and mono-chloroacetyl substituted 2-(N-lower alkylaminomethyl)benzhydrols obtained in this three stage reaction are oils and may, if desired be recovered and characterized, but are preferably used without further purification.

The 5-lower alkyl-1-phenyl-1,3,4,6-tetrahydro-5H-benz[f]-2,5-oxazocin-4-ones are converted to the 5-lower alkyl-1-phenyl - 1,3,4,6-tetrahydro-5H-benz[f]-2,5 - oxazocines, comprising the tangible embodiments of this invention in its final product composition aspect, by reduction with an alkali metal aluminohydride reducing agent, such as lithium aluminum hydride, at reflux temperature in the presence of an inert organic solvent such as tetrahydrofuran. The product is then recovered by conventional techniques of isolation and purification.

The tangible embodiments of this invention can, if desired, be converted into their non-toxic pharmaceutically acceptable acid-addition and quaternary ammonium salts. Salts which may be formed comprise, for example, salts with inorganic acids, such as the hydrochloride, hydrobromide, hydroiodide, sulfate, phosphate or the like. They may also comprise salts with organic acids, including monobasic acids such as the acetate or the propionate, and especially those with hydroxy organic acids and dibasic acids, such as citrate, tartrate, malate and maleate. Pharmaceutically, the salt will not be substantially more toxic than the compound itself and, to be acceptable, it should be able to be incorporated into conventional liquid or solid pharmaceutical media. Among the useful quaternary ammonium salts are those formed by such alkyl halides as methyl iodide, n-hexyl bromide and the like. Such pharmaceutically useful acid-addition and quaternary ammonium salts are the full equivalents of the bases from which they are derived and are included within the scope of this invention.

The tangible embodiments of this invention, either as free bases or in the form of a non-toxic pharmaceutically acceptable acid-addition or quaternary ammonium salt, can be combined with conventional pharmaceutical diluents and carriers to form such dosage forms as tablets, suspensions, solutions, suppositories and the like.

The best mode contemplated by the inventors for carrying out the invention will now be set forth as follows:

EXAMPLE (a) 2-(N-methylcarbamoyl)benzhydrol o-Carboxybenzhydrol-γ-lactone (2.0 g., 0.0095 mole) is suspended in 40% aqueous methylamine solution (20 ml.) and allowed to stand 18 hours at 0°–5° C. with occasional swirling. The product crystallizes from solution and is recovered by filtration, washed with water and dried to yield 1.7 g. (72%) of crystalline material, m.p. 125°–126° C.

(b) 2-(N-methylaminomethyl)benzhydrol

The 2-(N-methylcarbamoyl)benzhydrol (1.0 g., 0.004 mole) formed as described in "a" above, is dissolved in tetrahydrofuran (5 ml.) and the solution is added dropwise with stirring and cooling to a solution of lithium aluminum hydride (0.6 g.) in tetrahydrofuran (25 ml.). The mixture is refluxed for 18 hours, cooled and to it are added in succession water (0.7 ml.), 15% sodium hydroxide solution (0.7 ml.) and again water (2.1 ml.). The inorganic salts are removed by filtration and washed with tetrahydrofuran. The filtrate and combined washes are evaporated to dryness under reduced pressure and the residue dissolved in ether. The ether solution is washed with water, dried over anhydrous magnesium sulfate and the solvent removed under reduced pressure to yield 0.72 g. (76.5%) the desired compound as a yellow oil. The oxalate salt melts: 158°–159° C.

Analysis.—Calculated for $C_{17}H_{19}NO_5$: C, 64.34%; H, 6.04%; N, 4.41%. Found: C, 64.17%; H, 6.02%; N, 4.66%.

(c) 5-methyl-1-phenyl-1,3,4,6-tetrahydro-5H-benz[f]-2,5-oxazocin-4-one

1. The 2-(N-methylaminomethyl)benzhydrol (5.0 g., 0.022 mole), formed as described in "b" above, is dissolved in a mixture of ether (150 ml.) and pyridine (5 ml.) and the mixture cooled in an ice bath. To the mixture is then added dropwise and with stirring chloacetyl chloride (3.5 ml.) and the mixture is then allowed to stand for 3 hours at room temperature. The solvent is removed in vacuo. The residue remaining is dissolved in ether, the solution washed with water and dilute sodium hydroxide solution, dried and the ether then removed to yield 8.0 g. of 2-(N-methylchloroacetamidomethyl)-benzhydrol chloroacetate in the form of a colorless oil.

2. The colorless oil thus obtained is dissolved in 1 N methanolic sodium hydroxide (80 ml.) and allowed to stand at 5° C. for two hours. The solvent is removed under reduced pressure without heating and the residue dissolved in ether. The ether solution is washed with dilute hydrochloric acid, sodium hydroxide and water, then dried and the solvent removed in vacuo to yield 5.5 g. of 2-(N-methylchloroacetamidomethyl)benzhydrol in the form of a colorless oil.

3. A quantity (9.3 g., 0.031 mole) of 2-(N-methylchloroacetamidomethyl)benzhydrol thus obtained is dissolved in dimethyl sulfoxide (150 ml.) and the mixture cooled to 19° C. (melting point of dimethyl sulfoxide. Potassium-tert-butoxide (5.1 g., 80% pure, 0.037 mole) is added to the solution and most of the tert-butanol that forms is removed *in vacuo* without heating. The mixture is then heated to 50° C. for 15 minutes, allowed to stand at room temperature for 18 hours, then again heated to 50° for 15 minutes (this time under vacuum) and finally heated to 70°–80° C. to remove the dimethylsulfoxide. The residue remaining is dissolved in chloroform and the chloroform solution is washed successively with water, 1 N sodium hydroxide, water, 1 N hydrochloric acid and again water, followed by drying and removal of solvent under vacuum to yield 8.5 g. of product. Chromatography of the crude product with chloroform on acid-washed alumina yields 4.1 g. (50.5 g.) of crystalline product, m.p. 139°–143° C.

Analysis.—Calculated for $C_{17}H_{17}NO_2$: C, 76.38%; H, 6.41%; N, 5.24%. Found: C, 76.49%; H, 6.45%; N, 5.42%.

(d) 5-methyl-1-phenyl-1,3,4,6-tetrahydro-5H-benz[f]-2,5-oxazocine

The 5-methyl-5-phenylbenz[f]-2,5-oxazocin-4-one (4.1 g., 0.016 mole), prepared as described in "c" above, is added to lithium aluminum hydride (0.8 g., 0.021 mole) in tetrahydrofuran (75 ml.) and the mixture is refluxed for several hours. The mixture is then cooled and to it is added successively water (0.8 ml.), 15% sodium hydroxide solution (0.8 ml.) and again water (2.4 ml.). The granular precipitate is removed by filtration, washed with tetrahydrofuran and the combined filtrate and wash evaporated to dryness *in vacuo*. The residue is dissolved in ether, washed with water and extracted with 1 N hydrochloric acid. The acid extract is basified with 1 N sodium hydroxide, and extracted with ether. The ether is then removed *in vacuo* to yield 3.7 g. of yellow oil which is purified by chromatography on acid-washed alumina and elution with chloroform to yield 2.7 g. of a colorless oil. This oil is converted to the crystalline hydrochloride salt, m.p. 238°–242° C., for elemental analysis.

Analysis.—Calculated for $C_{17}H_{20}NOCl$: C, 70.45%; H, 6.96%; N, 4.83%; Cl, 12.24%. Found: C, 70.15%; H, 6.67%; N, 5.02%; Cl, 12.00%.

The subject matter which the applicants regard as their invention is particularly pointed out and distinctly claimed as follows.

We claim:
1. 5-Lower alkyl-1-phenyl-1,3,4,6-tetrahydro-5H-benz[f]-2,5-oxazocine.
2. 5-Methyl-1-phenyl-1,3,4,6 - tetrahydro-5H-benz[f]-2,5-oxoazocine.
3. 5-Lower alkyl-1-phenyl-1,3,4,6-tetrahydro-5H-benz[f]-oxazocin-4-one.
4. 5-Methyl-1-phenyl-1,3,4,6-tetrahydro-5H-benz[f]-2,5-oxazocin-4-one.

References Cited

Testa et al.: Farmaco (Pavia), Ed. Sci. *18*(11), 815–27 (1963); C.A. 60:6847f.

G. THOMAS TODD, Primary Examiner

U.S. Cl. X.R.

260—333, 559 R, 570 R; 424—244